United States Patent [19]

Suda et al.

[11] Patent Number: 4,810,070

[45] Date of Patent: Mar. 7, 1989

[54] LENS SYSTEM HAVING A GOOD IMAGE PERFORMANCE FOR WHITE LIGHT

[75] Inventors: Shigeyuki Suda, Machida; Jun Hattori, Atsugi; Nozomu Kitagishi, Hachioji; Hiroki Nakayama, Yokohama; Akihisa Horiuchi, Tokyo, all of Japan

[73] Assignee: Canon Kabushiki Kaisha, Tokyo, Japan

[21] Appl. No.: 901,059

[22] Filed: Aug. 26, 1986

[30] Foreign Application Priority Data

Aug. 30, 1985 [JP]   Japan ................................ 60-191412

[51] Int. Cl.⁴ ...................... G02B 3/00; G02B 15/14
[52] U.S. Cl. .................................... 350/413; 350/427
[58] Field of Search ................................ 350/413, 427

[56] References Cited

U.S. PATENT DOCUMENTS 3,718,383  2/1973  Moore .
3,729,253  4/1973  Moore .
4,099,850  7/1978  Matsui .
4,571,032  2/1986  Someya et al. ..................... 350/413

FOREIGN PATENT DOCUMENTS 0163015  8/1985  Japan ................................... 350/413

OTHER PUBLICATIONS

Introduction to Classical and Modern Optics (2nd Edition), Prentice-Hall, Inc., Jurgen R. Meyer-Arendt, M.D., pp. 362-365, Copyright 1972, 1984.
Applied Optics, vol. 23, No. 11, pp. 1735-1741, Gradient-Index Wide-Angle Photographic Objective Design, Atkinson III, et al., Jun. 1984.

Primary Examiner—John K. Corbin
Assistant Examiner—Rebecca D. Gass
Attorney, Agent, or Firm—Fitzpatrick, Cella, Harper & Scinto

[57] ABSTRACT

A lens system has a lens unit comprising a positive lens and a negative lens. The positive lens has an index distribution in the direction of the optic axis. The value of the index gradient for a light having a short wavelength in the vicinity of the vertex of at least one convex surface of the positive lens is smaller than the value of the index gradient for a light having a long wavelength.

8 Claims, 5 Drawing Sheets

SPHERICAL ABERRATION

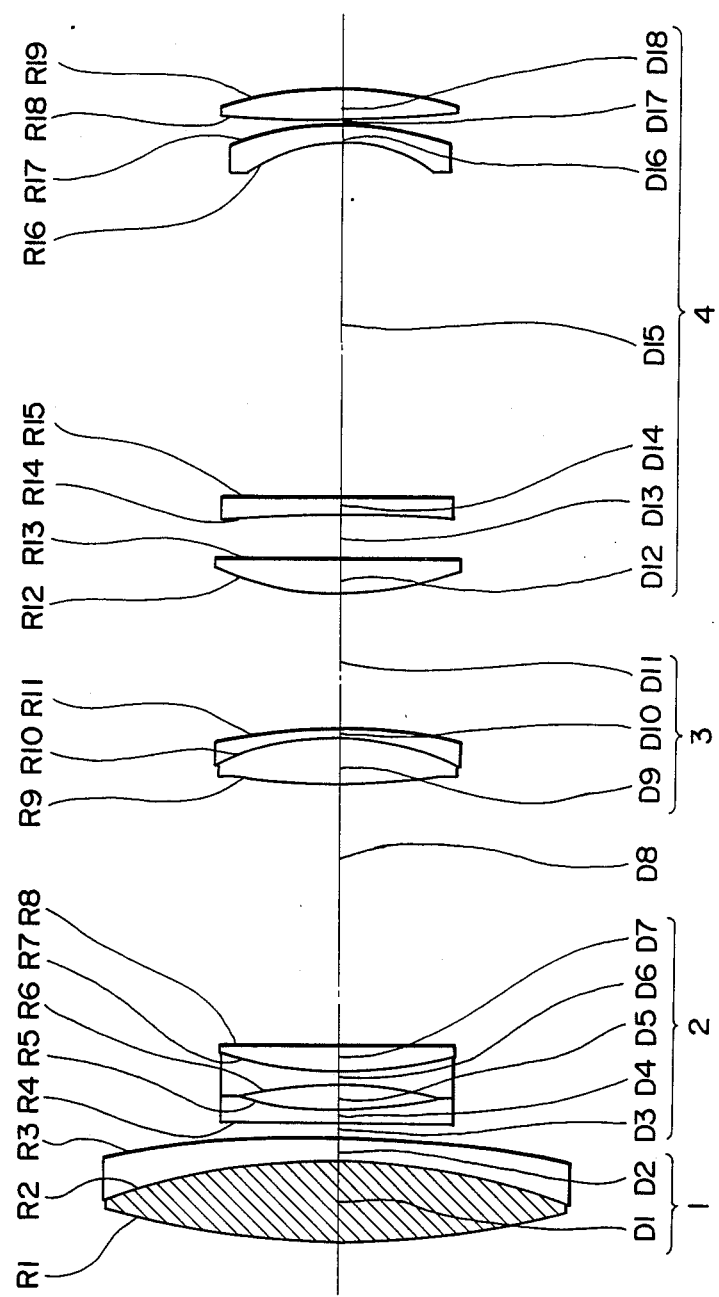

SPHERICAL
ABERRATION

LENS SYSTEM HAVING A GOOD IMAGE PERFORMANCE FOR WHITE LIGHT

BACKGROUND OF THE INVENTION

1. Field of the Invention

This invention relates to an imaging optical system such as a photographic lens, a video lens or an industrial collimator lens, and in particular to an imaging lens of a simple construction in which chromatic aberration has been corrected in the visible wavelength range.

2. Related Background Art

In recent years, the need for making image pick-up optical systems for consumer's use such as photographic lenses and video lenses or industrial lenses simple, compact and high in performance has been rising. As the means for achieving this, application of an aspherical lens, special glass having abnormal dispersion (for example, FK01 produced by Obara Kogaku Co., Ltd.) or quartzito is known, but this has often been commercially insufficient in cost.

The optical system according to the present invention overcomes the above-noted difficulty by applying to a lens element a gradient index lens recently utilized as a part for optical communications or the reading optical system of a copying apparatus or the like.

At present, numerous methods such as the ion exchanging method, the crystal growth method and the molecular staffing method are known as a technical means for making gradient index lenses, and from the practical viewpoint, it nearly seems that the area of the index distribution is of the order of 10 and several mm and the difference in refractive index is of the order of 0.2. As an example of the application of such gradient index lens, the design of an optical system comprising two gradient index lenses of 50 mm/F$_2$ for photographic lenses is shown in the treatise of Atkinson et al., *Applied Optics*, Vol 21, No. 6, 1982. However, this is an example which has an index distribution in a direction perpendicular to the optic axis, and also, in this example, the area of the variation in refractive index is great and therefore, there is a great limitation in the manufacture of base metal. Also, in Japanese Patent Application Laid-Open No. 149312/ 1984, it is proposed to use as a lens element a lens having an index distribution in the direction of the optic axis to make a great relative aperture lens of high performance for photography by the use of a blank which can be manufactured under the present situation. In this example, however, setting is made so that there is no dependency of the index gradient on wavelength and therefore, there is not included the point of vision at which the correction of chromatic aberration in the aberration area is positively effected, and the practical use of the index distribution as a lens for long focus is not intended. On the other hand, FIG. 7 of the accompanying drawings shows an example of the prior art which uses a lens uniform in refractive index, and the lens data of this lens are shown in Table 1 below, and the spherical aberrations of four wavelengths for showing the imaging characteristic are shown in FIG. 8 of the accompanying drawings.

TABLE 1 f = 200 mm   F No. 1:4   Object infinity point

R1 = 121.81975   R2 = −87.69947   R3 = −245.989
D1 = 14.0   D2 = 7.0
Refractive index of 1st lens Nd$_1$ = 1.50977
Abb number νd$_1$ = 62.1

TABLE 1-continued

Refractive index of 2nd lens Nd$_2$ = 1.67270
Abb number νd$_2$ = 32.1

As can be seen from FIG. 2 of the accompanying drawings, as a feature of the imaging characteristic of this type, the refractive power for a light having a short wavelength becomes greater in the joined surface R2 as the incidence height, i.e., the distance of the incident light ray from the optic axis, become greater. As a result, during the aberration correction, a correction balance in which paraxial chromatic aberration is undercorrected and marginal light is over-corrected must unavoidably be selected, and the number of lenses must unavoidably be increased to make the imaging characteristic for white light good.

SUMMARY OF THE INVENTION

It is an object of the present invention to improve the image characteristic for a light including lights of different wavelengths.

It is a secondary object of the present invention to improve the imaging characteristic for white light without increasing the number of lenses.

BRIEF DESCRIPTION OF THE DRAWINGS

FIG. 5 is a cross-sectional view of a lens according to Embodiment 1 of the present invention.

DESCRIPTION OF THE PREFERRED EMBODIMENTS

Figure 1A:
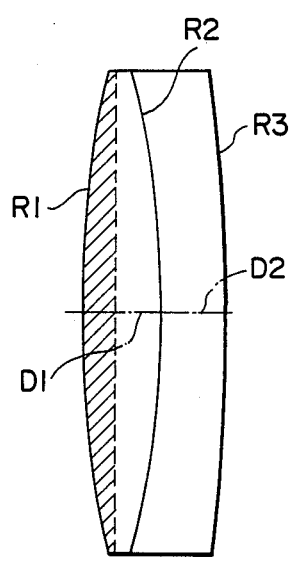
FIG. 1A is a cross-sectional view of a lens according to Embodiment 1 of the present invention.

The lens unit shown in the drawings comprises at least one positive lens and at least one negative lens disposed adjacent to each other, the positive lens being a lens having an index distribution in the direction of the optic axis, and the value of the index gradient for a light having a short wavelength in the vicinity of the vertex of at least one convex surface of the positive lens is made smaller than the value of the index gradient for a light having a long wavelength, whereby the positive lens can be made to have a high performance particularly for white light. Also, this lens is suitable particularly as a long focus lens.

In the embodiment shown in FIG. 1A, to make the present invention easily understood, an example in which a biconvex lens and a meniscus negative lens are cemented together is taken as the simplest construction. Actually, however, a convexo-planar lens or a positive meniscus lens and a negative lens may be cemented together or more than two lenses may be cemented together. Also, in the case of a biconvex lens, the opposite sides thereof can be endowed with an index distribution.

In a first embodiment of the present invention, a biconvex lens as a first lens from the object side and a meniscus negative lens as a second lens are cemented together and the refractive index becomes gradually smaller for the image plane direction from the vertex of the first surface of the first lens and the index gradient on the short wavelength (g-line) side is smaller than the index gradient on the long wavelength (c-line and d-line) side.

Figure 1B:
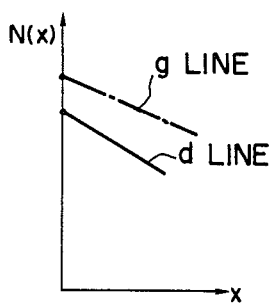
FIG. 1B shows the index distribution of the portion of FIG. 1A indicated by hatching.
Figure 2:
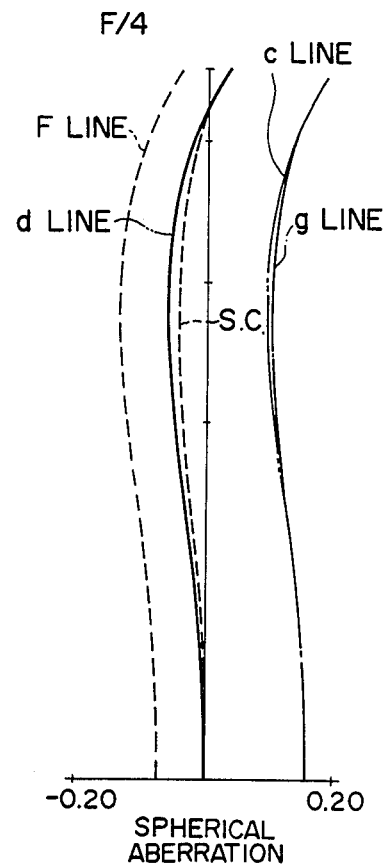
FIG. 2 shows the spherical aberration of the lens of FIG. 1A.

FIG. 1A shows a cross-sectional shape, and FIG. 2 shows spherical aberration. In the range of the lens of FIG. 1A which is indicated by hatching, the refractive index varies as depicted in FIG. 1B, and in the range beyond the broken line, the refractive index is constant. The gradient of the refractive index is exaggeratedly shown. The biconvex lens and the meniscus negative lens may be disposed with a minute clearance interposed therebetween.

Figure 3:
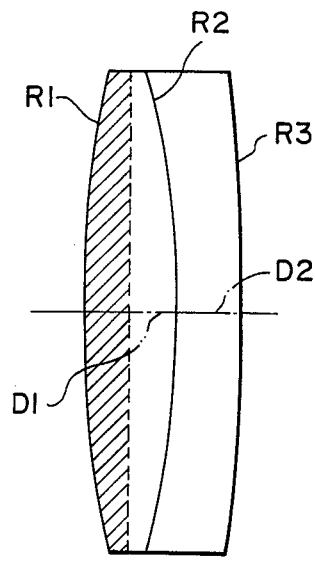
FIG. 3 is a cross-sectional view of a lens according to Embodiment 2 of the present invention.
Figure 4:
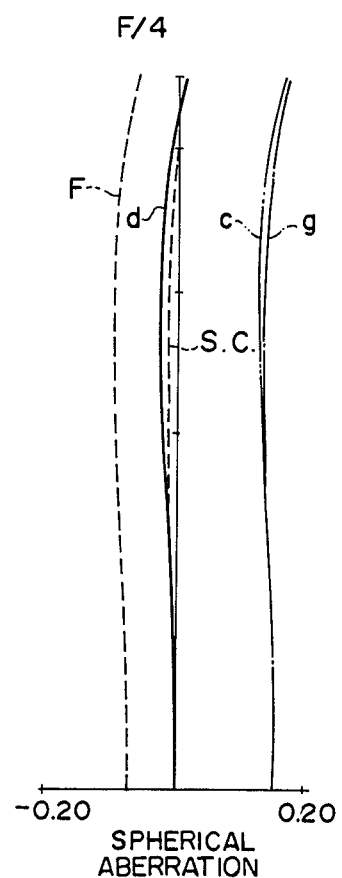
FIG. 4 shows the spherical abberation of the lens of FIG. 3.

At this time, the difference between the refractive index in the first surface of the lens for a long wavelength and the refractive index in said first surface for a short wavelength becomes gradually smaller as the incidence height becomes greater. Accordingly, as the incidence height becomes greater on the short wavelength side, the effect of alleviating spherical aberration which is over-corrected is obtained. Further, for the correction of then residual spherical aberration in the intermediate wavelength range, it is preferable that the index gradient for d-line itself be made into such a distribution shape that the refractive index in the surface of the lens becomes gradually lower as the incidence height becomes greater. The index distribution shape differs more or less depending on the amount of residual aberration, but in the lens unit of the specification shown in Embodiment 1 (Table 2), primary or secondary correction becomes possible with the distance from the optical axis as a function. Particularly as an example including the secondary term, the data of Embodiment 2 is shown in Table 3, the cross-sectional shape of the lens is shown in FIG. 3, and spherical aberration is shown in FIG. 4.

Embodiment 1

TABLE 2 f = 200 mm F-value = 4 Object infinity point
R1 = 120.34837  R2 = −102.23244  R3 = −236.48223
D1 = 8.27896  D2 = 7
First lens: Gradient index lens
$N\lambda(x) = N_0 + N_{1}x$ $(0 \leq x \leq 3.27896)$
$Nd(x) = 1.501142$, $vd = 58.0496$ $(3.27896 \leq x \leq 8.27896)$

| | λ | $N_0$ | $N_1$ |
|---|---|---|---|
| Nλ(x) | d | 1.50390 | $-8.38297 \times 10^{-4}$ |
| | g | 1.51320 | $-4.02526 \times 10^{-4}$ |
| | C | 1.50156 | $-9.24378 \times 10^{-4}$ |
| | F | 1.50196 | $-6.09340 \times 10^{-4}$ |

That is, at the vertex of the first surface,
Nd = 1.50389 and vd = 66.30; from the vertex,
3.27896; and thereafter, Nd = 1.501142 and
vd = 58.05, and therebetween, the index
distribution varies linearly.
Second lens: Homogeneous lens
Nd = 1.7285 vd = 28.50 (corresponding to SF10 produced by Obara Kogaku Co., Ltd.)
Incidentally, d-line: 5876Å, g-line: 4358Å,
C-line: 6563Å, F-line: 4861Å

Embodiment 2

TABLE 3 f = 200 mm F-value = 4 Object infinity point
R1 = 119.67951  R2 = −107.06252  R3 = −247.77507
D1 = 10.0  D2 = 7.0
First lens: Gradient index lens
$N\lambda(x) = N_0 + N_{1}x + N_{2}x^2$ $(0 \leq x \leq 5)$
$Nd(x) = 1.501142$, $vd = 58.0496$ $(5 \leq x \leq 10)$

| | λ | $N_0$ | $N_1$ | $N_2$ |
|---|---|---|---|---|
| Nλ(x) | d | 1.50636 | $-1.30977 \times 10^{-3}$ | $5.32292 \times 10^{-5}$ |
| | g | 1.51514 | $-9.30485 \times 10^{-4}$ | $5.57045 \times 10^{-5}$ |
| | C | 1.50413 | $-1.3846 \times 10^{-3}$ | $5.272 \times 10^{-5}$ |
| | F | 1.51135 | $-1.1088 \times 10^{-3}$ | $5.424 \times 10^{-5}$ |

That is, at the vertex of the first surface,
Nd = 1.506360 and vd = 70.14; at a distance of 2.5 mm
from the first surface, Nd = 1.503418 and vd = 63.60;
and at a distance of 5.0 mm and so forth from the
first surface, Nd = 1.501142 and vd = 58.05, and such
an index distribution is provided.
Second lens: Homogeneous lens
Nd = 1.7285 d = 28.50 (corresponding to SF10 produced by Obara Kogaku Co., Ltd.)

What has been described above is a lens of the simplest construction and can be used chiefly as an industrial collimator lens or the like, but of course, the present invention is applicable as an ordinary photographic lens or a video image pick-up lens.

Figure 6A:
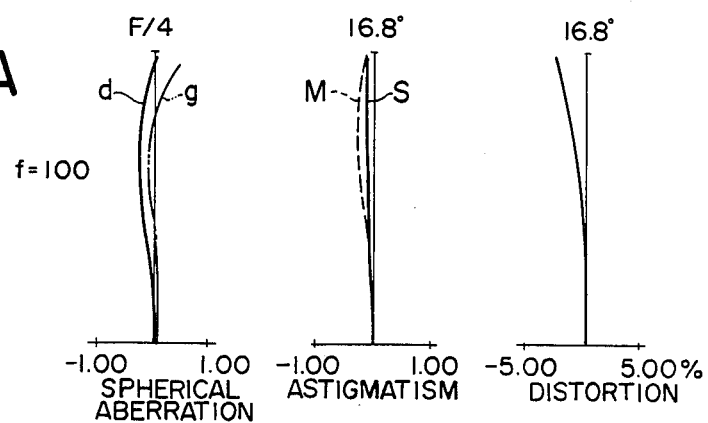
FIG. 6 shows the spherical aberration of the lens of FIG. 5.
Figure 6B:
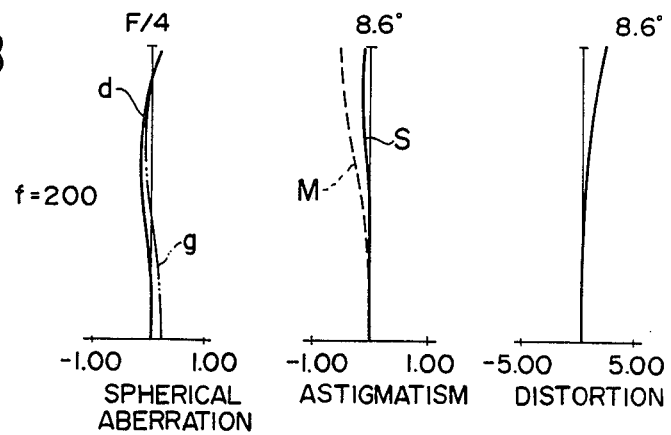
Figure 6C:
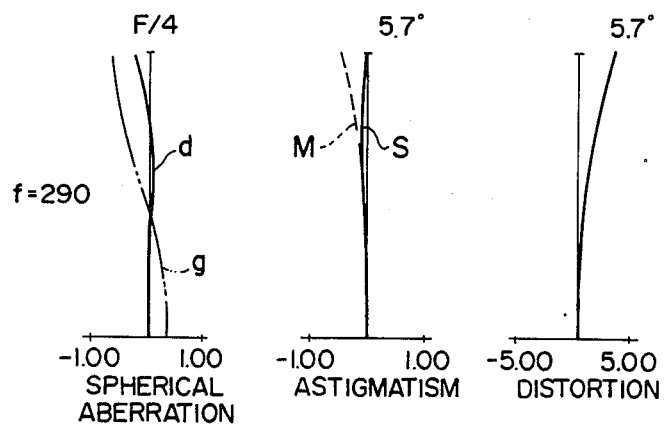
Figure 7:
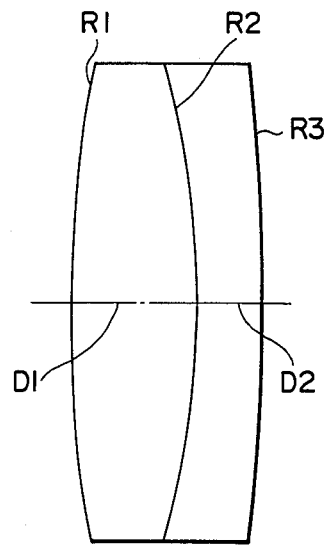
FIG. 7 is a cross-sectional view of a lens according to the prior art.
Figure 8:
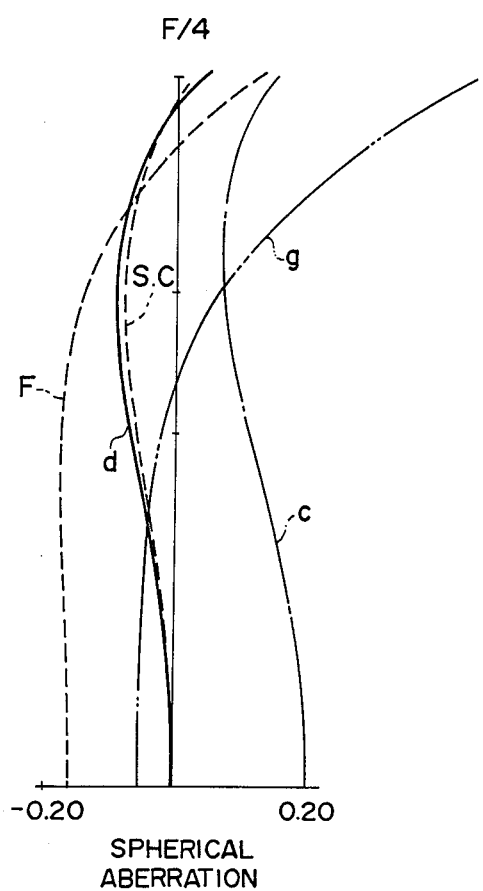
FIG. 8 shows the spherical aberration of the lens of FIG. 7.

As an example of it, a telephoto system zoom lens having a zoom ratio of three times used chiefly for photography is shown in Embodiment 3. In this embodiment, a gradient index lens is used as the first biconvex lens of a focusing lens 1. The cross-sectional shape of such lens is shown in FIG. 5, and the data of the lens are shown in Table 4. Reference numeral 2 designates a variator, reference numeral 3 denotes a compensator, and reference numeral 4 designates a relay lens. FIGS. 6A, 6B and 6C show the imaging characteristics.

In order to represent the index distribution, for the sake of convenience, the vertex adjacent to the object side is defined as the origin of the relative coordinates, and the refractive index Nλ(x) at a distance x from the origin, a wavelength of Fraunhofer's base line λ is represented by the following equation:

$$N\lambda(x) = N_0 + N_{1}x + N_{2}x^2 + N_{3}x^3 + \ldots$$

TABLE 4

First lens: Gradient index lens $N(x) = N_0 + N_{1}x + N_{2}x^2 + N_{3}x^3$

| | | $N_0$ | $N_1$ | $N_2$ | $N_3$ |
|---|---|---|---|---|---|
| Nλ(x) | d | 1.60311 | $-1.51742 \times 10^{-3}$ | $2.29202 \times 10^{-4}$ | $-3.95658 \times 10^{-6}$ |
| | g | 1.61539 | $-1.39973 \times 10^{-3}$ | $2.59689 \times 10^{-4}$ | $-6.43431 \times 10^{-6}$ |

| | f | | |
|---|---|---|---|
| Dm | 100 | 200 | 290 |
| D3 | 2.6089 | 47.7099 | 61.7243 |
| D8 | 47.4855 | 22.6420 | 0.2602 |
| D11 | 23.2529 | 2.9954 | 11.3628 | f = 100–290  FNo. = 1:4  2W = 33.6°–11.4°

| Radius of Curvature | On-axis air space of on-axis thickness | Refractive index | Abbe number |
|---|---|---|---|
| R1 = 128.849 | D1 = 15.13 | N1 = N(x) | |

-continued

| | f = 100–290 FNo. = 1:4 2W = 33.6°–11.4° | | |
|---|---|---|---|
| Radius of Curvature | On-axis air space of on-axis thickness | Refractive index | Abbe number |
| R2 = −96.127 | D2 = 3.34 | N2 = 1.80518 | ν2 = 25.4 |
| R3 = −201.366 | D3 = | | |
| R4 = −955.234 | D4 = 2.09 | N3 = 1.71300 | ν3 = 53.8 |
| R5 = 61.318 | D5 = 5.19 | | |
| R6 = −72.719 | D6 = 2.09 | N4 = 1.71300 | ν4 = 53.8 |
| R7 = 58.598 | D7 = 4.73 | N5 = 1.84666 | ν5 = 23.9 |
| R8 = 1250.516 | D8 = | | |
| R9 = 140.050 | D9 = 8.08 | N6 = 1.51633 | ν6 = 64.1 |
| R10 = −44.832 | D10 = 2.09 | N7 = 1.75520 | ν7 = 27.5 |
| R11 = −81.014 | D11 = | | |
| R12 = 52.943 | D12 = 6.27 | N8 = 1.61272 | ν8 = 56.8 |
| R13 = −6049.180 | D13 = 7.71 | | |
| R14 = −219.080 | D14 = 2.78 | N9 = 1.80518 | ν9 = 25.4 |
| R15 = 1076.434 | D15 = 63.62 | | |
| R16 = −28.135 | D16 = 2.78 | N10 = 1.80610 | ν10 = 40.9 |
| R17 = −58.485 | D17 = 0.28 | | |
| R18 = 311.033 | D18 = 5.01 | N11 = 1.59551 | ν11 = 37.9 |
| R19 = −75.128 | | | |

Although Embodiments 1 and 2 have been shown as having a focal length f=200 mm, it is possible to effect proportion and use these embodiments as a lens having a focal length of 100–300 mm. Likewise, Embodiment 3 has been shown as having a focal length f=100−290 mm, but is possible to effect proportion and use this embodiment as a lens having a focal length of 70–210 mm.

We claim:

1. A lens unit comprising a positive lens and a negative lens disposed adjacent to each other, said positive lens having an index distribution in the direction of the optic axis, said position lens having a convex surface, the index gradient for a light having a short wavelength being smaller than the index gradient for a light having a long wavelength in the vicinity of the vertex of said convex surface.

2. A lens unit according to claim 1, having a positive composite power.

3. A lens unit according to claim 2, which is a collimator lens.

4. A lens unit according to claim 1, wherein said positive lens and said negative lens are adhesively secured to each other.

5. A lens unit according to claim 4, wherein said positive lens is of a biconvex shape and said negative lens is of a biconcave shape.

6. A lens system having a plurality of lens units, one of said lens unit being provided with a positive lens and a negative lens, said positive lens having an index distribution in the direction of the optic axis, said positive lens having a convex surface, the index gradient for a light having a short wavelength being smaller than the index gradient for a light having a long wavelength in the vicinity of the vertex of said convex surface.

7. A lens system according to claim 6, which is a zoom lens.

8. A lens system according to claim 7, wherein the lens unit provided with the positive lens having an index distribution is a focusing lens.

* * * * *

UNITED STATES PATENT AND TRADEMARK OFFICE
CERTIFICATE OF CORRECTION

PATENT NO. : 4,810,070

DATED : March 7, 1989

INVENTOR(S) : SHIGEYUKI SUDA, ET AL.

It is certified that error appears in the above-identified patent and that said Letters Patent is hereby corrected as shown below:

COLUMN 2, line 11, "become" should read --becomes--;

line 39, "1" should read --3--.

Signed and Sealed this

Nineteenth Day of September, 1989

Attest:

DONALD J. QUIGG

Attesting Officer

Commissioner of Patents and Trademarks